United States Patent Office 3,686,264
Patented Aug. 22, 1972

3,686,264
PROCESS FOR PREPARING PREDOMINANTLY LINEAR PENTENE NITRILES
Pietro Albanese, Milan, Luigi Benzoni, Novara, Benedetto Corain, and Aldo Turco, Padova, Italy, assignors to Montecatini Edison S.p.A., Milan, Italy
No Drawing. Filed Feb. 27, 1970, Ser. No. 15,253
Claims priority, application Italy, Mar. 3, 1969, 13,592/69
Int. Cl. C07c *121/04*
U.S. Cl. 260—465.3        6 Claims

---

ABSTRACT OF THE DISCLOSURE

Unsaturated nitriles are synthesized from butadiene and hydrocyanic acid in the presence of phosphinic complexes of nickel which act as catalysts for the synthesis. The unsaturated nitriles are obtained in good yield, under mild conditions, and without the formation of polymers.

---

THE PRIOR ART

The catalytic addition of hydrocyanic acid to olefins which have not been activated by electronegative groups, present various problems and difficulties. In fact, if the addition is carried out in a heterogeneous phase using catalysts formed by metals, variously supported oxides, or salts, rather severe reaction conditions are required, such as temperatures in the range 300° C. to 500° C. and pressures of from 70 to 120 atm. In general, the yields are rather low and the selectivity is very poor, resulting in the production of various nitriles and polymers, which necessitates regenerating the catalyst after only a few hours of reaction.

Somewhat better results are obtained by operating in a homogeneous phase, with catalysts of the $Co_2(CO)_8$, $Ni(CO)_4$ type, with their derivatives substituted by triphenylphosphine or triphenylarsine (see JACS, 76, 1964), or with derivatives of nickel of the type of $$Ni[P(OR)_3]_4$$

(see Belgian Pats. Nos. 698,332; 698,333; and 700,420).

Using these last-mentioned catalysts, nitriles are obtained in good yields. However, the selectivity and production of desired nitriles are low. Thus, in the case of the addition of HCN to butadiene, besides the desired nitriles (3-pentenonitrile and 4-pentenonitrile) there are obtained, also, the branched isomers (2-methyl-3-butene-nitrile and 2-methyl-2-butene-nitrile) in amounts such that the molar ratio between the linear and branched nitriles is comprised between 1:1 and 2:1.

THE PRESENT INVENTION

We have now discovered some catalysts which, unexpectedly, promote the synthesis of unsaturated nitriles from butadiene and hydrocyanic acid in good yields and under mild conditions, and without the formation of polymers.

The catalysts used according to this invention are phosphinic complexes of nickel, having the following general formula:

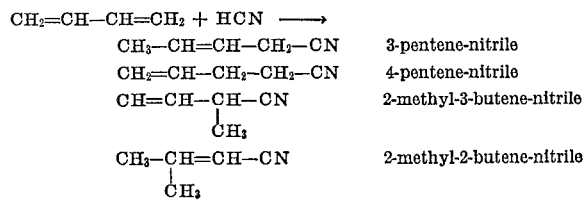

in which Ph represents phenyl and $n$ is a whole number and is either 2, 3 or 4. Specific phosphinic complexes of nickel embraced in said formula are:

$n=2$ $Ni[Ph_2P(CH_2)_2$—$PPh_2]_2$, hereinafter referred to as $Ni(dpe)_2$ of [1,2 - bis(diphenylphosphine)-ethane] nickel $n=3$ $Ni[Ph_2P$—$(CH_2)_3$—$PPh_2]_2$, hereinafter referred to as $Ni(dpp)_2$ of [1,3-bis(diphenylphosphine)-propane] nickel $n=4$ $Ni[Ph_2P$—$(CH_2)_4$—$PPh_2]_2$, hereinafter referred to as $Ni(ddp)_2$ of [1,3-bis(diphenylphosphine)-butane] nickel These phosphinic complexes of nickel can be prepared according to known processes, for instance by the process described by J. Chatt and F. A. Hart in Journal Chemical Society, 1960, page 1378 for $n=2$; by C. R. Van Hecke and W. Horrocks in Inorganic Chem. 5 (1966), page 1968 for $n=2$ or 3; and by B. Corain and P. Rigo in La Chimica e L'Industria (51, 386) for $n=4$.

The reaction between butadiene and hydrocyanic acid forms various nitriles:

$CH_2$=$CH$—$CH$=$CH_2$ + $HCN$ ⟶

| | |
|---|---|
| $CH_3$—$CH$=$CH$—$CH_2$—$CN$ | 3-pentene-nitrile |
| $CH_2$=$CH$—$CH_2$—$CH_2$—$CN$ | 4-pentene-nitrile |
| $CH$=$CH$—$CH$—$CN$<br>            $\|$<br>           $CH_3$ | 2-methyl-3-butene-nitrile |
| $CH_3$—$CH$=$CH$—$CN$<br>          $\|$<br>          $CH_3$ | 2-methyl-2-butene-nitrile |

The productivity of the present catalysts, defined as moles of pentene-linear nitriles obtained per each mole of catalyst, may exceed 100 in value. Thus, under suitable reaction conditions, the phosphinic complex in which $n=4$ permits the synthesis of the linear nitriles with a selectivity exceeding 90%, and makes it possible to attain a molar ratio of 30:1 between linear nitriles and branched nitriles. In other words, the production of the branched nitriles is inhibited or suppressed in favor of the production of the generally desired linear nitriles.

The reaction between the butadiene and HCN can be carried out in an inert solvent which is liquid at the reaction temperature and selected from arenes, such as for instance, benzene, toluene, xylene, etc.

The reaction may also be carried out in the absence of a solvent but under pressure.

The reaction is preferably carried out at temperatures varying from 50° C. to 200° C., and at autogeneous pressure, for a period of time of from 20 to 1 hour.

The catalyst and HCN concentrations in the reaction mixtures are preferably maintained low. The HCN concentration can vary from 0.01 to 20 moles per 100 moles of the mixture of catalyst, solvent, butadiene and HCN.

In order to insure preferential production of the linear nitrile and high conversions of HCN, it is preferred to use an HCN concentration lower than 10% molar. Also for the purpose of obtaining complete conversion of the HCN, the molar ratio between HCN and butadiene is preferably lower than 1.

The molar ratio between HCN and the catalyst varies, in general, from 10:1 to 1,000:1.

The reactants may be loaded together into the reactor, or the hydrocyanic acid can be bubbled into the mixture of the other components. At the end of the reaction, the products may be recovered by distillation or by chromatography.

The nitriles obtained according to this invention are useful intermediates for preparing amines or acids. The linear nitriles can be converted to adiponitrile, which is, in turn, useful as an intermediate in the production of hexamethylene adipamide or the production of adipic acid.

The following examples are given to illustrate the invention and are intended to be limited.

The analyses of the raw (total) reaction product reported in the examples were made by analytical gas-chromatography, preparation-gas-chromatography, infrared spectroscopy and nuclear magnetic reasonance.

For the gas-chromatography, there was used a 3.2 m. column having a diameter of 5 m. and containing, as a stationary phase, polyethylene glycol 1540 supported by a mixture of 30–60 mesh diatomaceous earth (Chromosorb W of the Johns-Manville Corp.), the absorbent being maintained at 90° C., the evaporation temperature being maintained at 120° C., and the duration of the elution of the 3-pentene-nitrile being about 30 minutes.

Example 1

Into a tubular stainless steel (inox) autoclave mounted on a rocker and having a holding capacity of 100 cc., were introduced in the following order, in an argon atmosphere:

32.5 g. (416 mM.) of anhydrous benzene
0.73 g. (0.80 mM.) of Ni(dpb)$_2$
1.15 g. (43 mM.) of HCN
3.20 g. (59 mM.) of butadiene.

This mixture was heated at 100° C. for 6 hours under constant stirring; it was then cooled down and finally discharged. The raw liquid, according to the gas-chromatographic analysis, proved to contain:

3.21 g. (39.6 mM.) of 3-pentene-nitrile
0.18 g. of branched isomers of pentene-nitrile (25% of 2-methyl-2-butene-nitrile and 75% of 2-methyl-3-butene-nitrile).

The conversion of the HCN was practically total. The yield in 3-pentene-nitrile, with respect to the HCN consumed, amounted to 92% (39.6 mM. to 43 mM.)

Example 2

Into the autoclave as described in Example 1 were loaded, in the given order:

29 g. (370 mM.) of anhydrous benzene
0.65 g. (0.71 mM.) of Ni(dpb)$_2$
1.02 g. (38 mM.) of HCN
2.80 g. (52 mM.) of butadiene.

Following the procedure described in Example 1, there was obtained, after 5 hours, a raw liquid which, by the gas-chromatographic analysis, was found to contain:

2.38 g. (29.4 mM.) of 3-pentene-nitrile
0.05 g. of branched isomers of pentene-nitrile.

Example 3

Into the same autoclave of Example 1 were loaded in the order stated:

45.1 g. (580 mM.) of anhydrous benzene
0.51 g. (0.57 mM.) of Ni(dpb)$_2$
1.59 g. (59 mM.) of HCN
4.5 g. (83 mM.) of butadiene.

By operating as in Example 1, after 10 hours a raw liquid was obtained which, analyzed by gas-chromatography, proved to contain:

4.5 g. (56 mM.) of 3-pentene-nitrile
0.24 g. of branched isomers of pentene-nitrile (30% of 2-methyl-2-butene-nitrile and 70% of 2 - methyl - 3 - butene-nitrile).

Example 4

Into the autoclave as described in Example 1 were loaded, in the given order:

28.1 g. (360 mM.) of anhydrous benzene
0.7 g. (0.77 mM.) of Ni(dpb)$_2$
1.07 g. (39.7 mM.) of HCN
3 g. (55.6 mM.) of butadiene This mixture was heated at 150° C. for 3 hours, under stirring, and was then cooled down and discharged. The raw liquid, on gas-chromatographic analysis, was found to contain:

2.36 g. (28 mM.) of 3-pentene-nitrile
0.52 g. of branched isomers of pentene-nitrile, consisting prevailingly of 2-methyl-2-butene-nitrile and 2-methyl-3-butene-nitrile

Example 5

Into the autoclave of Example 1 were loaded, in the stated order:

26.5 g. (340 mM.) of anhydrous benzene
0.60 g. (0.7 mM.) of Ni(dpe)$_2$
0.97 g. (36 mM.) of HCN
3.1 g. (57 mM.) of butadiene By operating as in Example 1, after 3 hours, there was obtained a raw liquid which, analyzed by gas-chromatography, proved to contain:

0.53 g. (6.5 mM.) of 3-pentene-nitrile
0.81 g. of branched isomers formed by 95% of 2-methyl-3-butene-nitrile

Example 6

Into an autoclave as specified in Example 1, were loaded, in the given order:

26.4 g. (340 mM.) of anhydrous benzene
0.60 g. of Ni(dpp)$_2$
1.0 g. (37 mM.) of HCN
2.8 g. (52 mM.) of butadiene By operating as in Example 1, after 1 hour a raw liquid was obtained which, on gas-chromatographic analysis, was found to contain:

0.14 g. (1.7 mM.) of 3-pentene-nitrile
0.16 g. of branched isomers, containing 20% of 2-methyl-2-butene-nitrile and 80% of 2-methyl-3-butene-nitrile Some changes may be made in practicing the present invention, without departing from its spirit. Therefore, we intend to include in the appended claims all modifications which will be obvious to those skilled in the art from the description and working examples given herein.

What we claim is:

1. A process for preparing predominantly linear pentene nitriles from butadiene and hydrocyanic acid, which comprises reacting the hydrocayanic acid and the butadiene in an acid/diene molar ratio below 1 at a temperature of from 50° to 200° C., and in the presence of a catalyst having the general formula $$Ni[Ph_2P—(CH_2)_4—PPh_2]_2$$

in which Ph represents the phenyl radical.

2. The process according to claim 1, further characterized in that the reaction is carried out in an arene which is liquid at the reaction temperature.

3. The process according to claim 1, further characterized in that the concentration of the hydrocyanic acid in the reaction mixture is maintained between 0.01 mole and 20 moles per 100 moles of the mixture.

4. The process according to claim 1, further characterized in that the concentration of the hydrocyanic acid in the reaction mixture is maintained at below 10 moles per 100 moles of the mixture.

5. The process according to claim 1, wherein the reaction is carried out in benzene at a temperature of about 100° C. for a period of from about 5 to 10 hours.

6. The process according to claim 1, characterized in that the hydrocyanic acid/catalyst molar ratio is from 10:1 to 1,000:1.

References Cited

UNITED STATES PATENTS

| | | | |
|---|---|---|---|
| 3,564,040 | 2/1971 | Downing et al. | 260—465.8 |
| 3,536,748 | 10/1970 | Drinkard Jr., et al. | 260—465.8 X |
| 3,496,218 | 2/1970 | Drinkard, Jr. | 260—465.8 |
| 3,496,217 | 2/1970 | Drinkard, Jr., et al. | 260—465.8 |
| 3,496,215 | 2/1970 | Drinkard, Jr., et al. | 260—465.8 |

JOSEPH P. BRUST, Primary Examiner

UNITED STATES PATENT OFFICE
CERTIFICATE OF CORRECTION

Patent No. 3,686,264    Dated August 22, 1972

Inventor(s) Pietro Albanese, et. al.

It is certified that error appears in the above-identified patent and that said Letters Patent are hereby corrected as shown below:

Column 2, line 5, "Ni(ddp)$_2$ of[1,3-bis(diphenylphosphine)-butane] nickel" should read -- Ni(dpb)$_2$ of[1,4-bis(diphenylphosphine)-butane]nickel-- ; last line, "reasonance" should read -- resonance -- . Column 4, line 42, "hydrocayanic" should read -- hydrocyanic -- . In the list of references cited, USP 3,536,748, "Class 465.8 X " should read -- Class 465.8XR -- .

Signed and sealed this 15th day of May 1973.

(SEAL)
Attest:

EDWARD M. FLETCHER, JR.
Attesting Officer

ROBERT GOTTSCHALK
Commissioner of Patents